(12) United States Patent
Cornelissen (10) Patent No.: US 10,066,793 B2
(45) Date of Patent: Sep. 4, 2018

(54) LED LUMINAIRE

(71) Applicant: PHILIPS LIGHTING HOLDING B.V., Eindhoven (NL)

(72) Inventor: Hugo Johan Cornelissen, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/116,986

(22) PCT Filed: Feb. 13, 2015

(86) PCT No.: PCT/EP2015/053154
§ 371 (c)(1),
(2) Date: Aug. 5, 2016

(87) PCT Pub. No.: WO2015/121446
PCT Pub. Date: Aug. 20, 2015

(65) Prior Publication Data
US 2017/0175955 A1    Jun. 22, 2017

(30) Foreign Application Priority Data
Feb. 13, 2014 (EP) .................. 14154962

(51) Int. Cl.
| F21V 7/04 | (2006.01) |
| F21K 9/61 | (2016.01) |
| F21K 9/68 | (2016.01) |
| F21V 7/06 | (2006.01) |
| F21V 8/00 | (2006.01) |

(Continued)

(52) U.S. Cl.
CPC .................. *F21K 9/61* (2016.08); *F21K 9/68* (2016.08); *F21S 8/04* (2013.01); *F21V 7/005* (2013.01);

(Continued)

(58) Field of Classification Search
CPC ..... G02B 6/005; G02B 6/0055; G02B 6/0031
(Continued)

(56) References Cited

U.S. PATENT DOCUMENTS 4,411,490 A * 10/1983 Daniel .................... F21S 11/00
362/557
7,726,848 B2    6/2010 Lai
(Continued)

FOREIGN PATENT DOCUMENTS

DE    102004024599 A1    12/2005
DE    202006016222 U1    1/2007
(Continued)

*Primary Examiner* — William Carter (57) ABSTRACT

A LED luminaire (100, 200, 300, 400, 500) is provided. The LED luminaire (100, 200, 300, 400, 500) comprises a LED light source (102) arranged to emit light into a light guide (104), the light guide (104) is arranged to guide the light from the LED light source (102) to a light out-coupling element (106). A reflector (108) forms a partly enclosed space (110) and comprises a slot (112), wherein the light guide (104) extends through the slot (112), the light out-coupling element (106) is arranged in the partly enclosed space (110) of the reflector (108), and the LED light source (102) is arranged outside the partly enclosed space (110) of the reflector (108) wherein the reflector (108) is arranged such that light exiting the reflector (108) has an angle different from zero with respect to a propagation direction of light in the light guide (104). This provides for a compact LED luminaire.

16 Claims, 4 Drawing Sheets

(51) Int. Cl.
*F21V 7/00* (2006.01)
*F21S 8/04* (2006.01)
*F21Y 115/10* (2016.01)

(52) U.S. Cl.
CPC .............. *F21V 7/0058* (2013.01); *F21V 7/06* (2013.01); *G02B 6/005* (2013.01); *G02B 6/0021* (2013.01); *G02B 6/0023* (2013.01); *G02B 6/0055* (2013.01); *F21Y 2115/10* (2016.08)

(58) Field of Classification Search
USPC ........................................ 362/606, 607, 617
See application file for complete search history.

(56) References Cited

U.S. PATENT DOCUMENTS

| | | |
|---|---|---|
| 2008/0186725 A1 | 8/2008 | Kpenv |
| 2012/0039050 A1 | 2/2012 | Chang et al. |
| 2013/0039050 A1* | 2/2013 | Dau ..................... G02B 6/0045 362/218 |
| 2014/0226317 A1* | 8/2014 | Livesay ................ H01L 33/641 362/147 |
| 2014/0347885 A1* | 11/2014 | Wilcox ................... F21S 8/061 362/612 |

FOREIGN PATENT DOCUMENTS

| | | |
|---|---|---|
| EP | 2518396 A2 | 10/2012 |
| FR | 2934353 A1 | 1/2010 |
| JP | 2007173177 A | 7/2007 |
| WO | 2007041574 A1 | 4/2007 |
| WO | 2009107056 A2 | 9/2009 |
| WO | 2010103450 A1 | 9/2010 |
| WO | 2011021135 A1 | 2/2011 |
| WO | 2013005151 A1 | 1/2013 |
| WO | 2013023008 A1 | 2/2013 |

* cited by examiner

····· original ref disk
——  long ref disk
—·— short ref disk

LED LUMINAIRE

CROSS-REFERENCE TO PRIOR APPLICATIONS

This application is the U.S. National Phase application under 35 U.S.C. § 371 of International Application No. PCT/EP2015/053154, filed on Feb. 13, 2015, which claims the benefit of European Patent Application No. 14154962.6, filed on Feb. 13, 2014. These applications are hereby incorporated by reference herein.

FIELD OF THE INVENTION

The present invention relates to a LED luminaire for improved light output.

BACKGROUND OF THE INVENTION

Semiconductor based light emitting diodes (LEDs) are among the most efficient light sources available today. LEDs provide longer lifetime, higher photon flux efficacy, lower operating voltage, narrow-band light emission, and flexibility in terms of assembly compared to conventional light sources.

Hence, it is often desirable for practical as well as aesthetical reasons to use LEDs in luminaires for general lighting purposes and functional light in public spaces, buildings, offices, homes etc.

The light output of a LED light source is generally not sufficient for most applications, and several LED light sources have to be combined to generate sufficient light levels. Increasing the number of LED light sources in a LED luminaire is, however, not straight forward as LED luminaires are not easily scalable in size or light output. Hence, the design of the LED luminaire has to be changed when more or fewer LEDs are required.

The fact that the LED light source is a small, high brightness light source presents opportunities as well as challenges. On the one hand the small size of the LED light sources allows for LED luminaires having a compact design, but on the other hand it is challenging to obtain an efficient light distribution within the LED luminaire and to avoid high brightness spots appearing in the LED luminaire.

A LED luminaire may further comprise wavelength converting materials in order to produce, for example, white light using LEDs emitting blue or ultra-violet light. The efficiency of such a LED luminaire is often limited by light absorption in the LED light source such that the amount of light received by the wavelength converting material is reduced. This results in reduced efficiencies for the LED luminaires.

JP 2007 173177 A discloses a lighting device comprising an LED emitting light into a light guide wherein a light exit surface of the light guide is provided in a reflector which collimates and directs the light exiting from the light guide.

SUMMARY OF THE INVENTION

It is an object of the present invention to overcome at least some of the above problems, and to provide a LED luminaire with improved light output and a compact design.

According to a first aspect of the invention, this and other objects are achieved by proving a LED luminaire. The LED luminaire comprises a LED light source arranged to emit light into a light guide, the light guide being arranged to guide the light from the LED light source to a light out-coupling element, and a reflector forming a partly enclosed space, the reflector comprising a slot, wherein the light guide extends through the slot, the light out-coupling element is arranged in the partly enclosed space of the reflector, and the LED light source is arranged outside the partly enclosed space of the reflector, wherein the reflector is arranged such that light exiting the reflector has an angle different from zero with respect to a propagation direction of light in the light guide.

It is advantageous that the slotted reflector partly encloses the light out-coupling element, but not the LED light source. The reflector may thereby cover a larger angular range of the light emitted from the LED light source, while mitigating problems associated with light absorption and/or shadowing by the LED light source. The reflector may also efficiently redirect and collimate light coupled out from the light out-coupling element. A LED luminaire with improved light output is thereby provided.

Light generated by the LED light source may further be spatially distributed within the light guide by multiple reflections within the light guide such that the light distributing volume of the LED luminaire becomes effectively larger. The light out-coupling element may further have a larger surface and/or volume than the LED light source. As a result larger volumes contribute to the light propagation and light emission in the LED luminaire such that problems associated with spottiness may be reduced. To this end, the LED luminaire has a scalable architecture for which the number of LED light sources may be easily changed to tailor the light intensity and/or spectral composition.

The wording light guide should here be understood as a structure arranged to transmit or guide light along its extension in a propagation direction. Light may for example propagate or be guided inside the light guide by multiple reflections. The light is preferably transmitted within the light guide by multiple reflections at the interface of the light-guide and its surrounding environment, i.e. by total internal reflection.

The light out-coupling element is an element arranged to couple light out from its interior volume to its surrounding environment.

The wording reflector should be construed as an object that reflects and directs light. The reflector has preferably a shape such that light is reflected in a desired direction.

A partly enclosed space should be construed as a space which is not fully surrounded by an enclosure such that there is at least one opening in the enclosure. Light may for instance be reflected out through the opening in the enclosure. In contrast, an enclosed space is to be construed as a space or volume enclosed on all sides. In other words, the enclosed space is a space surrounded by an enclosure on all its sides.

As the light exiting the reflector has a direction different from the propagation direction of light in the light guide, which is the direction into which the light guide extends, a compact LED luminaire may be obtained in at least one dimension. For example, the light guide is provided parallel to a ceiling surface, i.e. the light guide extends parallel to the ceiling surface and, hence, the propagation direction of light in the light guide is parallel to the ceiling surface, and the reflector is arranged such that light exiting the reflector is perpendicular to ceiling surface, thus having an angle of 90 degrees with respect to the propagation direction of light in the light guide. In this example the LED luminaire is relatively compact in a direction perpendicular to the ceiling surface, the size in this direction mainly being determined by the size of the reflector.

The reflector may be a parabolic reflector. This is an advantage as the reflector thereby covers a larger angular range of the light emitted from the LED light source such that efficient light emission is obtained from the LED luminaire.

The light out-coupling element may be arranged in a focal point of the parabolic reflector. Light emanating from the geometrical focus is reflected by the parabolic reflector such that parallel light rays are formed. The parallel light rays are parallel to each other and to the axis of symmetry of the parabolic reflector. As a result, light emitted from the light out-coupling element is efficiently directed by the parabolic reflector.

The light out-coupling element may be arranged at an edge portion of the light guide. This is advantageous as light may be efficiently coupled out from the light guide.

The LED luminaire may comprise a light out-coupling element arranged on the light guide at a location separated from an edge portion of the light guide. This may increase the light output from the LED luminaire.

The light out-coupling element may comprise a wavelength converting material.

By wavelength converting material is meant a material, capable of converting light of a first wavelength range into light of a second wavelength range. This provides means to adjust the spectral range of the light generated by the LED luminaire. In other words, light of a first wavelength range which is generated by the LED is at least partly converted into light of a second wavelength range by the wavelength converting material.

The light guide may be shaped as a disk or a rectangular plate. The shape of the light guide offers design flexibility. By for instance changing the shape of the light guide light distribution within and/or light in-coupling into the light guide is tuned.

The reflector may extend along a surface of the light guide. This provides light out-coupling along the extent of the surface which increases the light emission from the LED luminaire.

The phrasing surface of the light guide should be construed as a surface bounding the volume of the light guide.

The light guide may comprise a translucent material. Light emitted by the LED luminaire may thereby pass through the light guide. In other words, shadowing or blocking effects caused by the light guide within the reflector are reduced which increases the light output and improves the efficiency of the LED luminaire.

The wording translucent is to be understood as permitting the passage of light. Hence, translucent is to be understood as "permitting the passage of light" and a translucent material may either be clear, i.e. transparent, or transmitting and diffusing light so that objects beyond the light guide cannot be seen clearly. Transparent is to be understood as "able to be seen through".

The light guide may comprise a glass or a polymer material. This allows for a cost effective fabrication of the light guide. The light guide may further be made translucent by using such materials.

The light guide may have a thickness equal to or smaller than 3 mm, preferably smaller than 0.5 mm. This reduces the amount of material needed to fabricate the light guide, while allowing for light to be guided within the light guide.

The reflector may comprise a refractive element. This allows for efficient redirection of the light from the LED luminaire.

The LED light source may be arranged inside a cavity in the light guide. This allows for efficient in-coupling of light into the light guide.

The LED luminaire may comprise an interference filter arranged to filter light emitted from the LED light source into the light guide. The interference filter provides spectral and/or angular filtering of the light entering the light guide. The spectral range and/or the angular distribution of the light entering the light guide are thereby better controlled.

It is noted that the invention relates to all possible combinations of features recited in the claims.

BRIEF DESCRIPTION OF THE DRAWINGS

This and other aspects of the present invention will now be described in more detail, with reference to the appended drawings showing embodiments of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
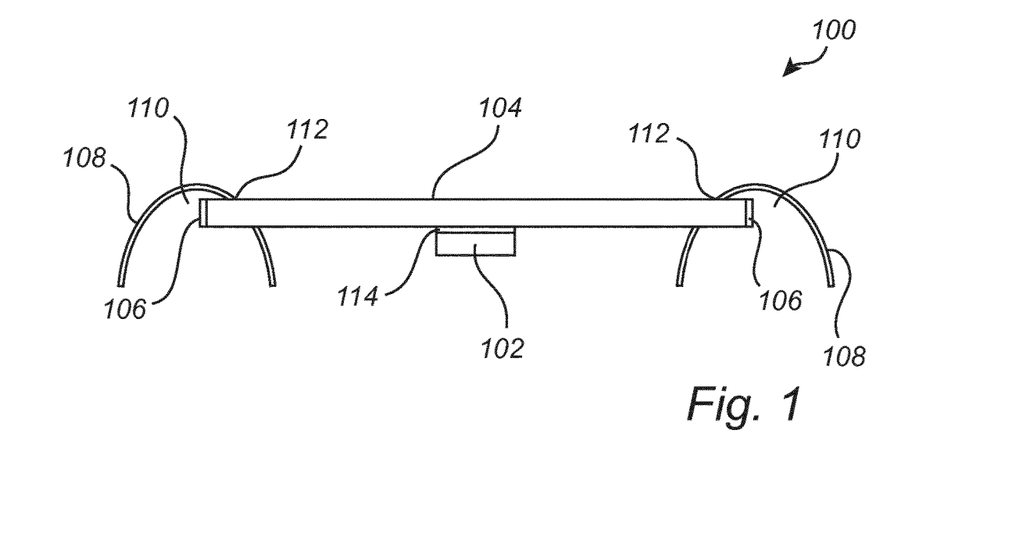
FIG. 1 illustrates a cross-sectional view of a LED luminaire according to an embodiment of the present invention.

FIG. 1 illustrates a cross-sectional view of a LED luminaire 100 according to an embodiment of the present invention. The LED luminaire 100 comprises a LED light source 102, a light guide 104 having a shape of a rectangular plate, two light out-coupling elements 106, and two reflectors 108.

The LED light source 102 is arranged to emit light into the light guide 104. Light is guided by total internal reflection in the light guide 104 from the LED light source 102 to the light out-coupling elements 106 arranged at opposite sides of the light guide 104. Light generated by the LED light source 102 is thereby spatially distributed using the light out-coupling elements 106 such that the light emitting surface of the LED luminaries becomes effectively larger. In other words, the light out-coupling elements 106 may be perceived as an illumination source which mitigates problems associated with spottiness.

The LED luminaire 100 has a scalable architecture such that the LED luminaire 100 may comprise a plurality of LED light sources (not shown) without the need of further changes of for example the shape and number of out-coupling elements of the LED luminaire 100.

The LED light sources may be placed at any location of the light guide 104 as long as light emitted by the LED light sources is efficiently coupled into the light guide 104. By providing a plurality of LED light sources it is possible to efficiently tailor the light intensity and/or spectral composition of the LED luminaire 100.

The LED light source 102 comprises combinations of GaN with In (InGaN) or Al (AlGaN). These material combinations are advantageous to use as they allow for tailoring of the emission energy of the photons emitted by the light emitting structure 102. In other words, the band gap of the semiconductor alloy is dependent on the ratio of In and/or Al to GaN. Different band gaps, i.e. band gap energies, correspond to emission of light having different emission energies (different colors). Hence, by changing the composition of the semiconductor alloy LEDs with colors ranging from red to blue may be obtained.

Other III-V semiconductor materials may also be used to provide high-brightness light emitting structures operating in the ultraviolet, visible or infrared regions of the electromagnetic spectrum. The materials may for example include binary, ternary and quaternary alloys of gallium, aluminum, indium, nitrogen, phosphorus and arsenic. II-VI semiconductors may also be used.

It is, as disclosed in FIG. 1, preferred that the light out-coupling elements 106 form a single unit with the light guide 104 such that reflections at interfaces between the elements 106 and the light guide 104 are reduced. The single unit further simplifies handling of the LED luminaire 100.

The light guide 104 may be made of the translucent polymer material PolyMethacrylate (PMMA). This provides cost effective fabrication of the light guide.

According to other embodiments the light guide may comprise a polymer such as PolyCarbonate (PC), PolyStyrene (PS), PolyUrethane (PU), a glass material, or Silicone.

The reflectors 108 form partly enclosed spaces 110. The reflectors 108 further comprise slots 112, through which the light guide 104 extends such that the light out-coupling elements 106 are located in the partly enclosed spaces 110. By this arrangement the reflectors 108 cover a larger angular range of the light emitted from the LED light source 102. In other words, the arrangement allows light exiting the light out-coupling elements 106 to be efficiently reflected by the reflectors 108. The slots 112 are provided in a side of the reflectors 108, such that the light guide 104 extends, or penetrates, into the reflectors 108 via the side of the reflectors 108. The reflectors 108 are thus arranged such that the light guide 104 enters the reflectors 108 in horizontal direction via slots 112. Light propagates, or is transmitted, in the light guide 104 towards opposite sides of the light guide where the light out-coupling elements 106 are provided and, after exiting the out-coupling elements, the light will be redirected by the reflectors 108 into a direction that is different from the propagation direction of the light in the light guide 104. The propagation direction of light in the light guide 104 is thus along an extension of the light guide 104.

Problems associated with light absorption and/or shadowing by the LED light source 102 is further mitigated by arranging the LED light source 102 outside the partly enclosed spaces 110 of the reflectors 108.

The LED luminaire 100 comprises an interference filter 114. The interference filter 114 is according to this embodiment an interference filter providing angular filtering of light emitted by the LED light source 102. The filter reflects light incident to the light guide at small angles of incidence but passes light at incidence angles that are larger than the critical angle of the light guide. By this arrangement light having large incident angles is more effectively sent in to the light guide 104 where it is guided by the light guide 104 by means of total internal reflection.

Light emitted from the LED light source 102 at small angles are reflected back into the LED light source 102 where multiply scattering may redirect light such that at least a portion of the light passes the interference filter 114. In other words, the interference filter 114 thereby reduces the amount of light that enter the light guide 104 with angles of incidence smaller than the critical angle, i.e. the amount of light emitted from the LED light source 102 that penetrates through the light guide 104 is reduced. Hence, light is more effectively guided to the light out-coupling element 106 and a more efficient LED luminaire 100 is provided.

The wording total internal reflection should be construed as an optical effect that occurs when a ray of light reaches a boundary between a first and a second medium at an angle larger than a critical angle, with respect to the normal of the boundary surface. For total internal reflection to occur it is needed that the refractive index of the first medium, i.e. the light guide, is larger than the refractive index of the second material, i.e. the air surrounding the light guide. If this condition is fulfilled the light rays are totally reflected at the boundary such that no light propagates beyond the boundary and all light is substantially reflected at the boundary.

Figure 2:
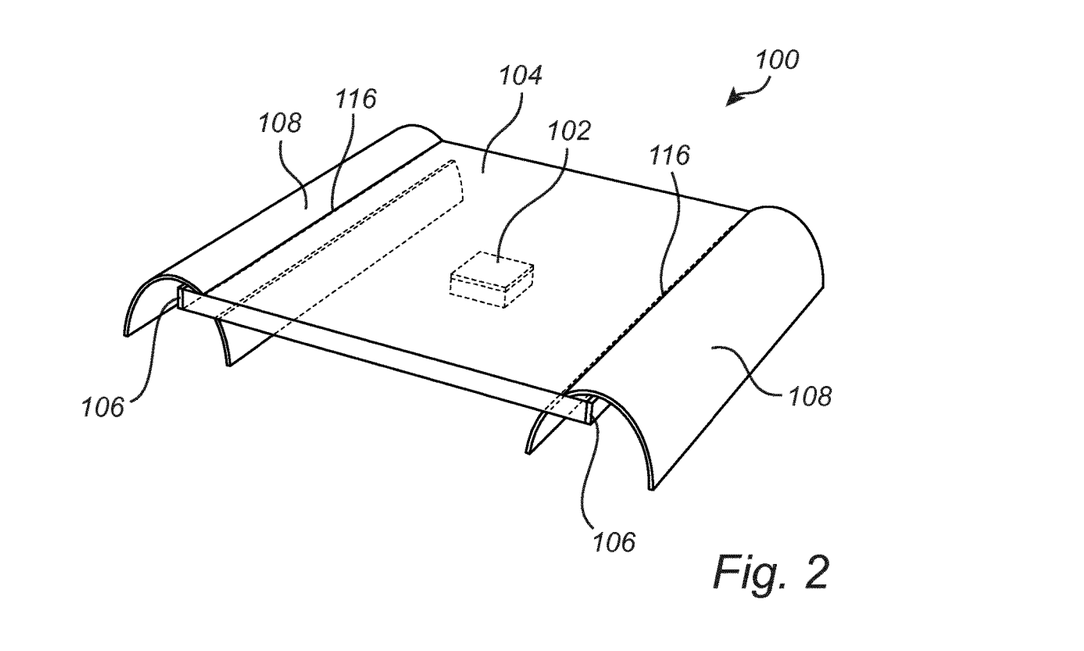
FIG. 2 shows a perspective view of the LED luminaire of FIG. 1.

FIG. 2 shows a perspective view of the same LED luminaire 100 as illustrated in FIG. 1. The light guide 104 is shaped as a rectangular plate and the light out-coupling elements 106 are arranged at two, in this case opposite, edge portions of the light guide 104. In another embodiment (not shown) the light guide 104 is a rod. The rectangular shape allows easy manufacturing of the light guide 104 by for instance extrusion. The arrangement is further advantageous as light from the LED light source 102 is efficiently distributed in the entire light guide 104 and subsequently coupled out from the light guide 104 by the, oppositely positioned, light out-coupling elements 106. The propagation direction of light in the rectangular plate shaped light guide 104 is thus along an extension of the light guide 104, or along a plane of the rectangular plate. The reflectors 108 further extend along two surfaces 116 of the light guide 104. This provides light out-coupling along the extent of the surfaces 116 which increases the light emission from the LED luminaire 100. Furthermore, the reflectors 108 redirect the light into a direction that is different from the main direction of the light exiting the light guide 104, in this example the light exiting the reflectors 108 will have an angle of around 90 degrees with respect to the light propagation direction in the light guide 104. In this embodiment the reflectors 108 have a parabolic cross-section. The rectangular plate shaped light guide 104, in this case, has an angle of 90 degrees with a symmetry axis of the parabolic reflectors 108. Thus, the light exiting the parabolic reflectors 108 has an angle of 90 degrees with respect to a propagation direction of light in the rectangular plate shaped light guide 104, which is in this case in a direction of the light out-coupling elements 106 at opposite edge portions of the rectangular plate shaped light guide 104. In other words, the reflectors 108 redirect the light exiting the light guide 104 such that this light has an angle of 90 degrees with respect to the propagation direction of the light in the light guide 104. In case the LED luminaire is attached to or suspended at a ceiling, wherein the rectangular plate of the light guide is arranged parallel to a ceiling surface, a compact downward illuminating LED luminaire is obtained, because the light guide has a relatively small dimension in a direction perpendicular to the ceiling surface and the parabolic reflectors thus mainly determine the size of the LED luminaire in a direction perpendicular to the ceiling surface.

The LED light source 102 is illustrated as being arranged below the light guide 104. In another embodiment the LED light source may, however, be arranged above or at a side surface of the light guide 104.

The light guide may have a thickness equal to or smaller than 3 mm, preferably smaller than 0.5 mm. This reduces the amount of material needed to fabricate the light guide 104. In addition, this provides flexibility of the light guide 104 which facilitates shaping of the light guide 104.

Figure 3:
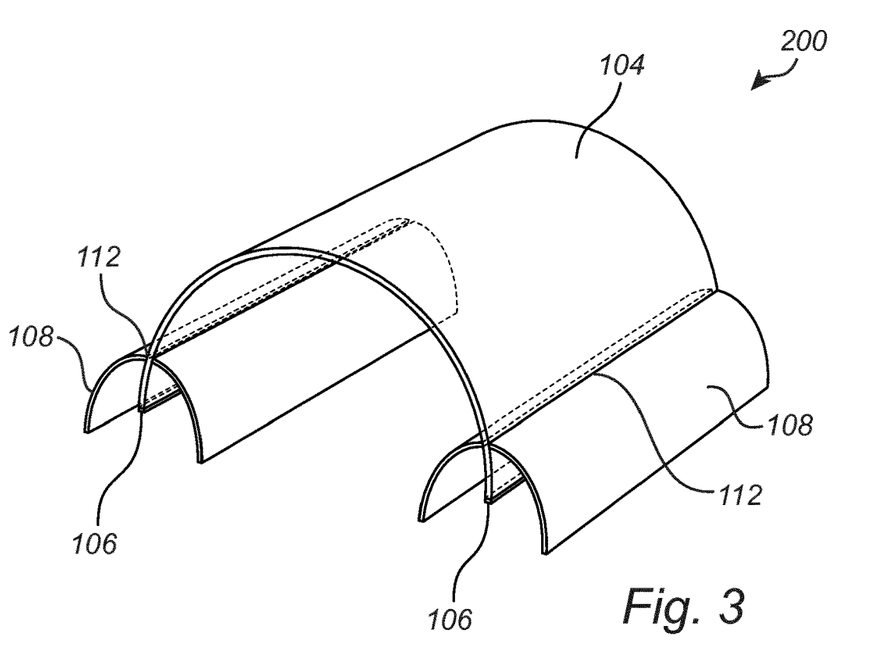
FIG. 3 shows a perspective view of a LED luminaire.

FIG. 3 illustrates a LED luminaire 200 having an arch bridge shaped light guide 104. The arch bridge is made of translucent PMMA and has a diameter of 200 mm. The radius of the arch is made about ten times larger than the thickness of the light guide 104 in order to allow for total internal reflection in the light guide 104. The LED light source (not shown) may be positioned anywhere on the arch, for instance in the apex of the arc. The reflectors 108 are arranged such that the light guide 104 enters the reflectors 108 in vertical direction via slots 112.

Figure 4:
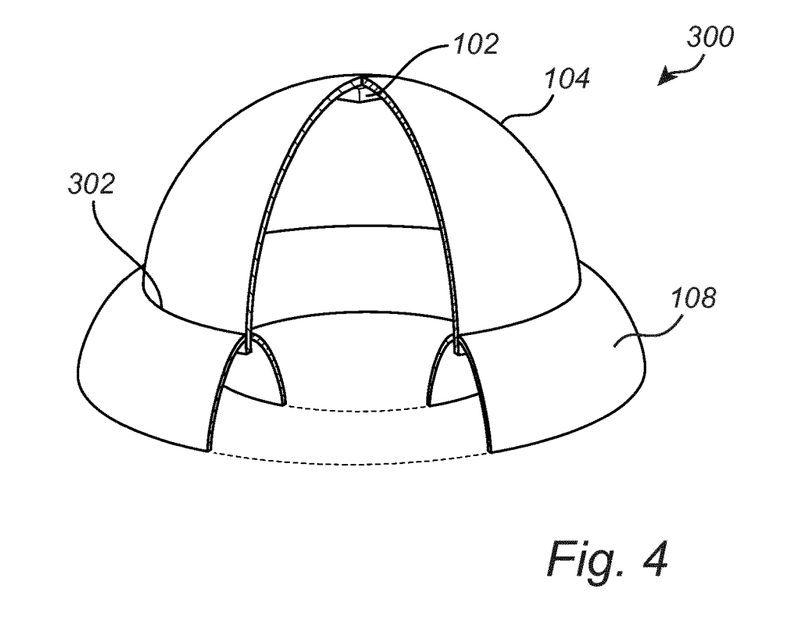
FIG. 4 shows a perspective view of a LED luminaire.

FIG. 4 shows a perspective view of a LED luminaire 300 having a dome shaped light guide 104. The reflector 108 extends along the full rim 302 of the dome to increase the light output from the LED luminaire 300.

Figure 5:
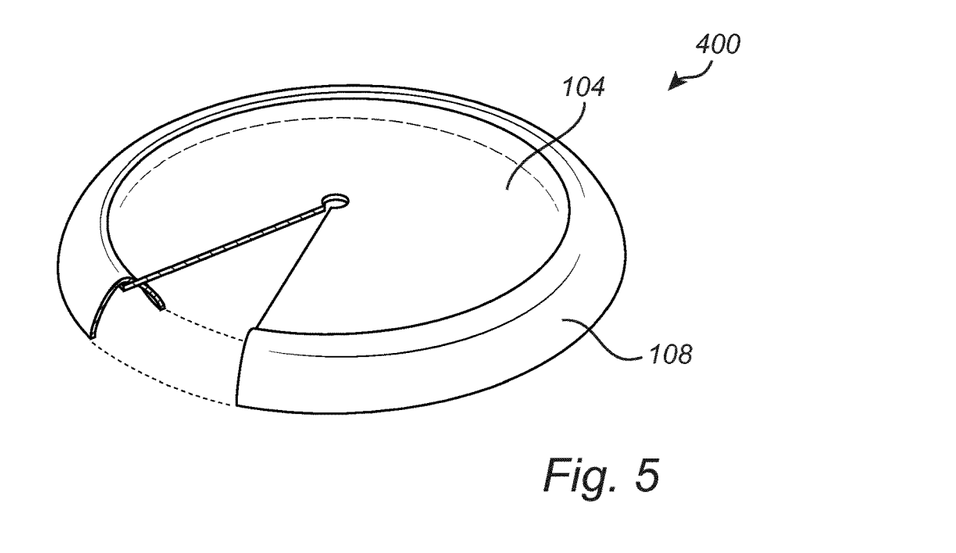
FIG. 5 shows a perspective view of a LED luminaire according to an embodiment of the present invention.

FIG. 5 shows a perspective view of a LED luminaire 400 according to an embodiment of the present invention. The LED luminaire 400 has a light guide 104 shaped as a disk. The reflector 108 extends along the full rim of the disk. The reflector may in other embodiments partly extend along the rim. Light exiting the, in this case parabolic, reflector 108 has an angle of 90 degrees with respect to the propagation direction of light in the disk shaped light guide 104, in this case this propagation direction is directed towards an outer edge of the disk. In other words, the reflectors 108 redirect the light exiting the light guide 104 such that this light has an angle of 90 degrees with respect to the propagation direction of the light in the light guide 104. In case this LED luminaire is attached to or suspended at a ceiling, wherein the disk of the light guide is arranged parallel to a ceiling surface, a compact, downward illuminating, LED luminaire is obtained, because the light guide has a relatively small dimension in a direction perpendicular to the ceiling surface and the parabolic reflectors thus mainly determine the size of the LED luminaire in a direction perpendicular to the ceiling surface.

For all the different embodiments of a LED luminaire according to the present invention, the dimensions of the reflector 108 may be chosen to achieve a certain beam shape and degree of directionality for the light emitted by the LED luminaire. It is advantageous that the reflector is a parabolic reflector as the parabolic reflector may thereby cover a larger angular range of the light emitted from the LED light source such that efficient light emission is obtained from the LED luminaire.

The light out-coupling element 106 is arranged in a focal point of the parabolic reflector 108. Light emanating from the geometrical focus is reflected by the parabolic reflector 108 such that parallel light rays are formed. The parallel light rays are parallel to each other and to the axis of symmetry of the parabolic reflector 108. As a result the light emitted from the light out-coupling element 106 may be efficiently (re)directed by the parabolic reflector 108, for example in another main direction than the main direction of the light in and exiting the light guide 104.

Figure 6:
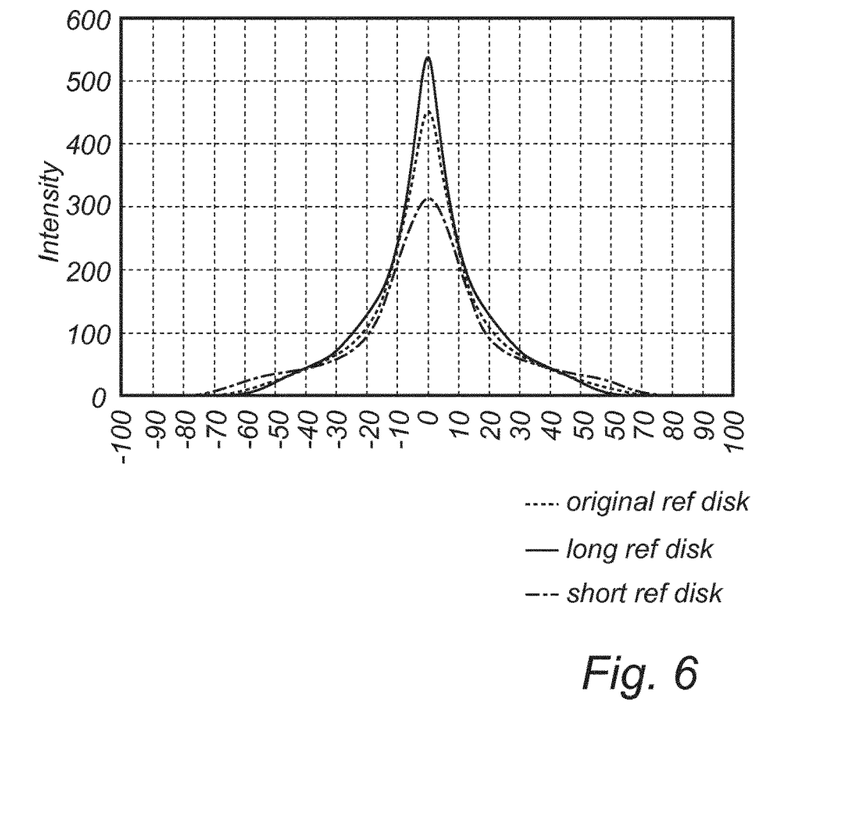
FIG. 6 shows the calculated luminous intensity for the LED luminaire of FIG. 5 as function of the reflector dimension.

FIG. 6 shows the calculated luminous intensity for a luminaire having a disk shaped light guide 104 having a diameter of 300 mm. The light guide 104 has a thickness of 3 mm and the out-coupling element 106 is arranged in the focal point, at f=5 mm, of the parabolic reflector 108. The heights of parabolic reflector 108 are in the calculations 15, 30 and 90 mm, respectively and are referred to as being short, original or long. From the diagram in FIG. 6 it may be deduced that for these dimensions soft-edge spot illumination profiles are obtained at a distance of 1 m below the LED luminaire 400 with Full Width at Half Maxima of about 2×10 degrees.

It should be noted that in other embodiments the light guide may enter the reflector horizontally or vertically or at any other angle. This provides additional design flexibility of the LED luminaires.

The reflector may comprise a plurality of parabolic structures for which the focal points coincide. Light originating from an out-coupling element may thereby be emitted in a plurality of directions. The light in the respective directions are parallel to each other and to the axis of symmetry of the corresponding parabolic reflector. By such an arrangement a LED luminaire such as a suspended LED luminaire may for example provide ceiling illumination as well as downward illumination.

According to other embodiments the reflector may have a shape differing from the parabolic shape. The reflector may for example have a hemispheric shape.

Figure 7:
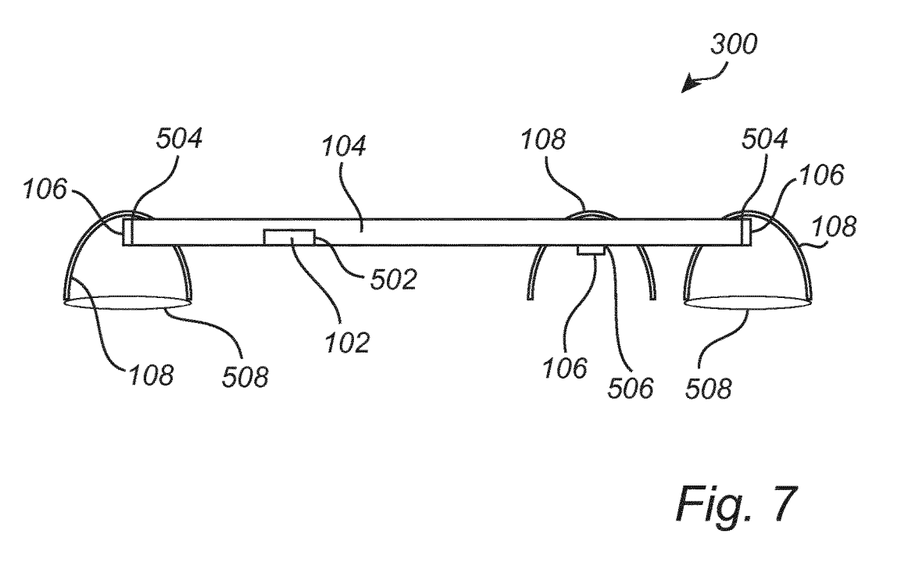
FIG. 7 shows a cross-sectional view of a LED luminaire according to an embodiment of the present invention.

FIG. 7 shows a cross-sectional view of a LED luminaire 500 in which the LED light source 102 is arranged inside a cavity 502 in the light guide 104. This allows for efficient in-coupling of light into the light guide 104. In another embodiment the LED light source is integrated in the light guide, wherein the light guide for example comprises a growth substrate of the LED light source.

The LED luminaire 500 comprises light out-coupling elements 106 at opposite edge portions 504 of the light guide 104 and at a location 506 separated from the edge portion 504 of the light guide 104. The reflectors 108 are arranged in the vicinity of each of the light out-coupling elements 106 to redirect and focus the light coupled out. This increases the light output from the LED luminaire 500.

The reflector 108 further comprises a refractive element 508. The refractive element is here a diverging lens arranged to efficiently distribute light emitted from the LED luminaire reflector such that a large area is illuminated by the LED luminaire.

In other embodiments the LED luminaire may comprise a refractive element such as a focusing lens or a prism.

In other embodiments the LED luminaire may comprise a plurality of light out-coupling elements arranged within or at the surface of the light guide.

The person skilled in the art realizes that the present invention by no means is limited to the preferred embodiments described above. On the contrary, many modifications and variations are possible within the scope of the appended claims.

For example, the LED light source of the LED luminaire may be in thermal contact with the reflector in order to provide improved thermal management of the LED light source.

The light guide may have triangular, square, heptagonic, hexagonal shapes and may further comprise an elliptical or irregularly bent structure.

The light out-coupling elements 106 may comprise a wavelength converting material. The light emitted by the wavelength converting material may be emitted into the light guide where it undergoes multiple reflections before it is coupled out by the light out-coupling elements 106. This increases the amount of light that is coupled out of the LED luminaire.

The wavelength converting material may be attached to a surface of the light guide 104 as this improves the out-coupling of light from the light guide 104. The attachment of the wavelength converting material to the light guide 104 may for example be done by coating, printing or gluing.

Wavelength converting material may alternatively be integrated within the light guide.

The wavelength converting material may comprise a phosphor material. A phosphor material is, in context of the present invention, defined as a material or substance which after optical excitation exhibits light emission by luminescence, fluorescence or phosphorescence processes.

The phosphor material provides means to adjust the spectral range of the light generated by the LED light source, which may for example generate blue light. In other words the blue light may be converted to a wavelength range having longer wavelengths such that the light emitted by the LED luminaire comprises light with different spectral ranges. The light generated by the LED luminaire may be perceived as white.

For example a LED luminaire according to the present invention may provide white light illumination by combining blue light emitted from a InGaN-GaN LED light source 102 with a phosphor material comprising $Y_3Al_5O_{12}:Ce_{3+}$, YAG:Ce, which is a yellow emitting phosphor. The emission from the LED light source 102 has an intensity maximum in the wavelength range of 440-470 nm. Light from the LED light source 102 may is at least party be absorbed by the YAG:Ce phosphor and down-converted to the characteristic broad yellow emission of the phosphor material.

In other embodiments the light emitted by the LED luminaire may have a color differing from white.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A LED luminaire comprising:
    a LED light source arranged to emit light into a light guide, the light guide being arranged to guide the light from the LED light source to a light out-coupling element, and
    a reflector forming a partly enclosed space, the reflector comprising a slot, wherein the light guide extends through the slot, the light out-coupling element is arranged in the partly enclosed space of the reflector and the LED light source is arranged outside the partly enclosed space of the reflector, wherein the reflector is arranged such that light exiting the reflector has an angle different from zero with respect to a propagation direction of light in the light guide, wherein the light out-coupling element is arranged completely within the partly enclosed space of the reflector and the LED light source is arranged completely outside the partly enclosed space of the reflector.

2. The LED luminaire according to claim 1, wherein the light exiting the reflector has an angle of 90 degrees with respect to the light propagation direction in the light guide.

3. The LED luminaire according to claim 1, wherein the reflector is a parabolic reflector.

4. The LED luminaire according to claim 3, wherein the light out-coupling element is arranged in a focal point of the parabolic reflector.

5. The LED luminaire according to claim 1, wherein the reflector comprises a plurality of parabolic structures for which the focal points coincide.

6. The LED luminaire according to claim 1, wherein the light out-coupling element is arranged at an edge portion of the light guide.

7. The LED luminaire according to claim 1, comprising a light out-coupling element arranged on the light guide at a location separated from an edge portion of the light guide.

8. The LED luminaire according to claim 1, wherein the light out-coupling element comprises a wavelength converting material.

9. The LED luminaire according to claim 1, wherein the light guide is shaped as a disk or a rectangular plate.

10. The LED luminaire according to claim 1, wherein the reflector extends along a surface of the light guide.

11. The LED luminaire according to claim 1, wherein the reflector comprises a refractive element.

12. The LED luminaire according to claim 1, wherein the LED light source is arranged inside a cavity in the light guide.

13. The LED luminaire according to claim 1, wherein the LED luminaire (100) comprises an interference filter arranged to provide angular filtering light emitted from the LED light source before the light is emitted into the light guide.

14. The LED luminaire according to claim 1, wherein the light guide is shaped as a rectangular plate, light out-coupling elements are arranged at two opposite edge portions of the light guide and reflectors extend along two opposite surfaces of the light guide.

15. The LED luminaire according to claim 1, wherein the light guide comprises a translucent material for reducing shadowing or blocking effects caused by the light guide within the reflector.

16. A LED luminaire comprising:
    a LED light source arranged to emit light into a light guide, the light guide being arranged to guide the light from the LED light source to a light out-coupling element, and a reflector forming a partly enclosed space, the light out-coupling element is arranged in the partly enclosed space of the reflector and the LED light source is arranged outside the partly enclosed space of the reflector, wherein the reflector is arranged such that light exiting the reflector has an angle different from zero with respect to a propagation direction of light in the light guide, wherein the light out-coupling element is arranged completely within the partly enclosed space of the reflector and the LED light source is arranged completely outside the partly enclosed space of the reflector.

\* \* \* \* \*